(12) United States Patent
Shapiro et al.

(10) Patent No.: US 11,049,193 B1
(45) Date of Patent: Jun. 29, 2021

(54) SELECTION OF ADVERTISEMENTS BASED ON SOCIAL NETWORKING SYSTEM LOGIN STATUS

(71) Applicant: Facebook, Inc., Menlo Park, CA (US)

(72) Inventors: Scott Shapiro, San Francisco, CA (US); Brian T. Boland, Bellevue, WA (US); Kelly MacLean, Sunnyvale, CA (US); Nipun Mathur, Belmont, CA (US)

(73) Assignee: Facebook, Inc., Menlo Park, CA (US)

( * ) Notice: Subject to any disclaimer, the term of this patent is extended or adjusted under 35 U.S.C. 154(b) by 5 days.

(21) Appl. No.: 16/510,328

(22) Filed: Jul. 12, 2019

Related U.S. Application Data

(63) Continuation of application No. 13/770,763, filed on Feb. 19, 2013, now Pat. No. 10,410,296.

(51) Int. Cl.
 *G06Q 30/00* (2012.01)
 *G06Q 50/00* (2012.01)
 *G06Q 30/02* (2012.01)

(52) U.S. Cl.
 CPC ......... *G06Q 50/01* (2013.01); *G06Q 30/0255* (2013.01); *G06Q 30/0269* (2013.01)

(58) Field of Classification Search
 CPC ..................................................... G06Q 50/01
 See application file for complete search history.

(56) References Cited

U.S. PATENT DOCUMENTS

| | | | |
|---|---|---|---|
| 2005/0021441 A1 | 1/2005 | Flake et al. | |
| 2007/0027765 A1 | 2/2007 | Collins et al. | |
| 2010/0106613 A1 | 4/2010 | Bhatia et al. | |
| 2011/0093603 A1* | 4/2011 | Cheng | H04L 67/14 709/229 |
| 2012/0078727 A1 | 3/2012 | Lee | |
| 2013/0097311 A1 | 4/2013 | Mazumdar et al. | |
| 2013/0117108 A1 | 5/2013 | Spears et al. | |
| 2013/0124331 A1* | 5/2013 | Doughty | G06Q 30/0255 705/14.66 |
| 2014/0006170 A1 | 1/2014 | Collette et al. | |
| 2016/0314131 A1* | 10/2016 | Leicht | H04L 67/306 |
| 2017/0262890 A1* | 9/2017 | Agarwal | G06Q 30/02 |

(Continued)

OTHER PUBLICATIONS

Anonymous, "What is Social Media Advertising or Social Media Marketing," Oct. 2012, five pages.

(Continued)

*Primary Examiner* — Alvin L Brown
(74) *Attorney, Agent, or Firm* — Fenwick & West LLP

(57) ABSTRACT

An ad bidder receives a request from a user device to select an advertisement ("ad") for presentation along with a web page. The ad bidder includes a user profile database and may be a social networking system. The ad bidder determines if the user of the user device is logged into the ad bidder and selects the advertisement based on information in the user profile database if the user is logged into the ad bidder. If the ad bidder determines the user is not logged into the ad bidder, the ad bidder retrieves a device cookie stored on the user device. The device cookie describes interactions with content from the user device, such as viewed web pages or ads. Data stored by the device cookie is then used to select the ad for presentation.

20 Claims, 2 Drawing Sheets

(56) References Cited

U.S. PATENT DOCUMENTS

2017/0329776 A1* 11/2017 Suleman ................ G06Q 50/01

OTHER PUBLICATIONS techterms.com, "Cookie," Jul. 9, 2011, two pages, [Online] [Retrieved on Jun. 13, 2014] Retrieved from the Internet <URL: http://www.techterms.com/definition/cookie>.

techterms.com, "Log on," Feb. 8, 2011, two pages, [Online] [Retrieved on Jun. 13, 2014] Retrieved from the Internet <URL: http://www.techterms.com/definition/log_on>.

* cited by examiner

SELECTION OF ADVERTISEMENTS BASED ON SOCIAL NETWORKING SYSTEM LOGIN STATUS

CROSS REFERENCE TO RELATED APPLICATIONS

This application is a continuation of co-pending U.S. application Ser. No. 13/770,763, filed Feb. 19, 2013, which is incorporated by reference in its entirety.

BACKGROUND

This invention relates generally to online advertising and in particular to selecting advertisements likely to be relevant to viewing users.

Online advertising allows advertisers to present viewing users with advertisements (ads) via web pages and/or applications. Advertisers use various methods of ad targeting to present viewing users with relevant ads to increase the likelihood that a viewing user interacts with an ad. For example, ad targeting increases the likelihood of a viewing user performing a conversion event, such as accessing a presented ad, visiting a web page associated with an advertiser, or otherwise responding to the ad. Hence, ad targeting may generate a greater demand and awareness for goods and services.

Ad targeting allows advertisers to present different advertisements to different groups of people, such as persons in a certain age demographic or persons having a particular set of characteristics. While conventional techniques for targeting advertisements allow presentation of an advertisement to a group or a category of users, conventional ad targeting techniques have limited ability to t to identify characteristics or preferences of the viewing user. Hence, conventional ad targeting methods are limited gathering information about a viewing user for use in targeting advertisements to the viewing user.

SUMMARY

An ad bidder provides advertisements ("ads") to display along with web pages from a third-party server. The ad bidder may comprise a social networking system or exchange data with a social networking system. A user device includes a social network cookie which indicates whether a user of the user device is logged into a social networking system. The social network cookie indicates whether the user of the computing device is involved in an active session exchanging data between the user device and the social networking system. When the user requests to view a third party web page from the user device, the ad bidder checks the user device for the social network cookie and the user device sends information associated with the social network cookie or sends the social network cookie itself to the ad bidder. In one embodiment, if the social network cookie is stored on the user device, the user is currently exchanging data with the social networking system, which allows the ad bidder to use information about the user maintained by the social networking system to select an advertisement for presentation along with the third party web page. For example, information about other users connected to the user, actions performed by the user and stored by the social networking system, user profile information associated with the user, or other suitable information from the social networking system is used by the ad bidder to identify an advertisement.

However, if the user device does not include the social network cookie or if the social network cookie includes data indicating the user is not exchanging data with the social networking system, the ad bidder checks the user device for a device cookie. The device cookie includes data describing content accessed by the user via the user device. For example, the device cookie identifies web pages visited by the user from the user device, ads presented to the user via the user device, actions performed by the user on third party web pages via the user device, or other suitable interactions with content through the user device. In one embodiment, a social-plug in included on one or more third-party web pages captures information about user interactions with content for storage by the device cookie. Hence, if the social network cookie is not stored on the user device, the ad bidder retrieves information about a user's interactions with content from the device cookie, and uses the information from the device cookie to identify an advertisement.

In one embodiment, if the third party system providing the third party web page accessed by the user is associated with the social networking system, the third party system may obtain a user identifier associated with the user by the social networking system and communicate the user identifier to the social networking system. For example, the third party system may prompt the user for social networking system login information or may retrieve stored social networking system login information based on identifying information received by the third party system. This allows the ad bidder to use information associated with the user by the social networking system to select advertisements even when the user is not logged into the social networking system. One or more privacy settings specified by the user may limit the ad bidder's access to information associated with the user by the social networking system.

Figure 1:
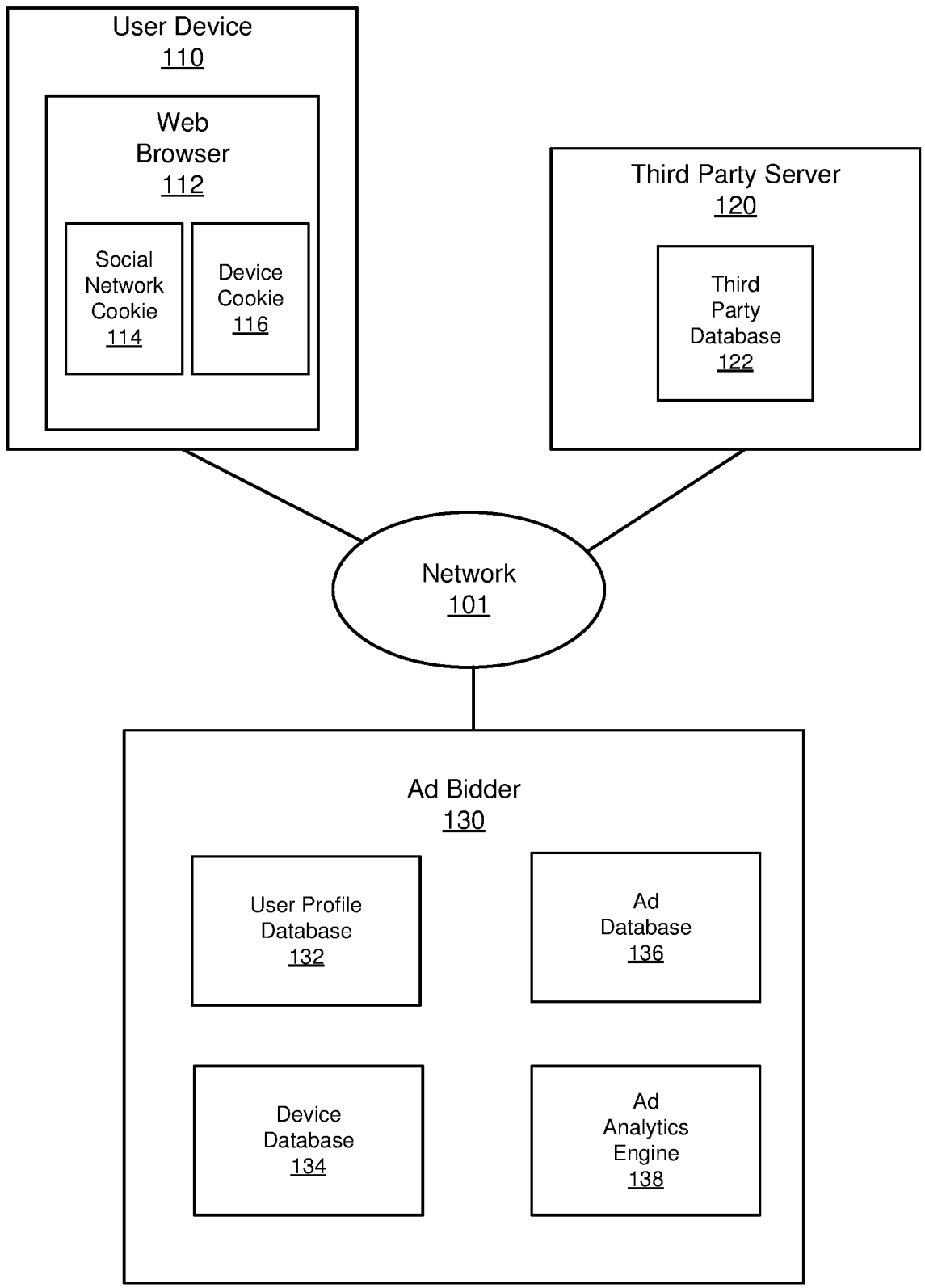
FIG. 1 is high level block diagram illustrating a system environment, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Online advertisements are provided by an ad bidder to viewing users via a web page or an online application. In some embodiments, the ad bidder provides ads directly to the third-party server providing a web page. In other embodiments, the ad bidder directs ads to the third-party server providing the web page from other content providers that provide ads. An ad bidder may be an entity connecting advertisers to web sites that host advertisements. In some implementations, an ad bidder aggregates ad space supplied by third party ad publishers and matches the supplied ad space with advertisers. In one embodiment, the advertisements are provided by third party advertisers and stored in an advertisement ("ad") database. In another embodiment, the ad bidder provides advertisements from its ad database. In some embodiments, the ad bidder is a social networking system, is part of the social networking system, or exchanges data with a social networking system.

A social networking system allows users to communicate and interact with other users. Users join the social networking system and add connections to other users. Each user has a user profile associated with user information. The user profile may include information about the user's age, gender, geographic location, education history, work history, and the like. Additionally, users may share information that may be interesting or relevant to other users, such as interests, news, links, comments, photos, or multimedia. The social networking system stores data about each user in an associated user profile Users of a social networking system may include entities, such as businesses, manufacturers of goods, retailers, corporations, organizations, communities, groups, or other non-individuals. An entity may create and maintain a brand page on the social networking system. The brand page includes information associated with an entity, allowing users to obtain information about the entity via the brand page. Users may connect to the brand page to receive updates or information about the brand or products provided by the brand. Users may also express interest in a brand in the social networking system. For example, users can express a preference for, comment on, or post content about a brand or product on their user profiles or on the brand page.

The social networking system includes edges, which are connections between users and/or between users and objects (e.g., pages) in the social networking system. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system, such as expressing interest in a page on the social networking system, sharing a link with other users of the social networking system, and commenting on posts made by other users of the social networking system. These edges are stored in the social networking system in association with the users and objects in the system.

Affinity scores for objects, interests, pages, and other users may be generated and stored in the social networking system. Affinity scores may be computed by the social networking system over time to approximate a user's affinity for an object, interest, and other users based on the actions performed by the user. Computation of affinity is further described in U.S. patent application Ser. No. 12/978,265, filed on Dec. 23, 2010, which is hereby incorporated by reference in its entirety.

The social networking system may also store actions performed by its users. Examples of actions include: expressing a preference for ("liking") or commenting on a post, uploading an image or link, sending or reading a message, clicking on a link or image, viewing content associated with another user, adding content to another user's page, among others. Actions between a user and a user profile of an entity (e.g., a brand page), between a user and a user profile of another user, or between a user and an object be stored in the social networking system. Each user's interaction with an object in the social networking system may be associated with the user performing the interaction. In one embodiment, if the user interacts with an object associated with a brand page, an identification of the brand page is also stored. In some embodiments, data about a user's actions are used to infer interests or preferences of the user, augmenting the interests included in the user profile and allowing a more complete understanding of user preferences.

FIG. 1 is a high-level block diagram of a system environment 100 in which an advertisement ("ad") bidder 130 operates. In the embodiment shown by FIG. 1, the system environment 100 comprises a network 101, a user device 110, a third party server 120, and an ad bidder 130. In alternative configurations, different and/or additional components may be included in the system environment 100. Additionally, the embodiments described herein may be adapted to online systems that are not ad bidder systems.

The network 101 is a communication pathway for one or more user devices 110, the third party server 120, and/or the ad bidder 130. The network 101 may comprise any combination of local area and/or wide area networks using both wireless and/or wired communication systems. For example, the network 101 may include the Internet, as well as mobile telephone networks. In one embodiment, the network 101 uses standard communications technologies and/or protocols. Hence, the network 101 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 101 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 101 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities on the network 101 can use custom and/or dedicated data communications technologies instead of, or in addition to, the ones described above.

The user device 110 may be a desktop computer, laptop computer, portable computer, smart phone, personal digital assistant (PDAs), or any other device including computing functionality and data communication capabilities. The user device 110 is configured to communicate with the ad bidder 130 or the third party server 120 via the network 101. In one embodiment, the user device 110 executes an application allowing the user of the user device 110 to interact with the ad bidder 130 and/or the third party server 120.

The third party server 120 is a server including a third party database 122 that stores data for one or more third party web pages. A third party web page may include content for, or associated with, a brand, a manufacturer, a retailer, a business, a corporation, a community, an organization, a group, an individual, or any other topic of interest. The third party web page includes one or more designated spaces for presenting advertisements.

The third party server 120 may be associated with or managed by a third party entity, such as a business entity, company, corporation or organization. In some embodiments, the third party entity may be connected to the ad bidder 130 and granted access to user information stored by the ad bidder 130. For example, if the ad bidder 130 stores information about interests, preferences, and other demographic information about users in a user database, the third party server 120 may request access to a user's information to select relevant ads for the particular user if the third party server 120 is connected to the ad bidder 130 or is otherwise authorized by the ad bidder 130 to access data. In some embodiments, the user grants the third party server 120 access to the user's information stored on the ad bidder 130. Additionally, a user may associate one or more privacy settings with data associated with the user and stored by the ad bidder 130, so the user information accessible to the third party server 120.

The ad bidder 130 shown in FIG. 1 comprises a user profile database 132, a device database 134, an ad database 136 and an ad analytics engine 138. In alternative configurations, different and/or additional components may be included in the ad bidder 130.

The user profile database 132 stores data describing users associated with the ad bidder 130. For example, the user profile database 132 includes a user profile associated with each user of the ad bidder 130. In some embodiments, the user profiles belong to users of a social networking system associated with the ad bidder 130. Information in a user profile may describe a user's age, gender, geographic location, education history, work history, and the like. A user profile may also include data about the user's interests inferred by the user's actions in a social networking system and/or actions by the user on external, third party web sites. For example, a user's activity on a third party web page (e.g., clicks on ads or links, preferences for content, or shares of content on the web page) may be communicated from the web page to the ad bidder 130 or to a social networking system associated with the ad bidder 130.

The device database 134 stores data about one or more user devices 110 that are associated with users. For example, the device database 134 receives identifying information for a user device 110, such as an Internet Protocol (IP) address or an identification (ID) number, and associates the information identifying the user device 110 with a user profile. A user device 110 may be used by multiple users. For example, a home computer may be used by each family member of a household. Activity associated with the user device 110, such as visits to web pages, interactions with advertisements, or impressions of ads, may be stored on a web browser 112 of the user device 110 and transmitted to the ad bidder 130, where the data is stored in the device database 134.

As referred to herein, a "cookie" is a data sent from a website and stored on a user's web browser when a user visits a website. When a user first visits a web page from a user device 110, the server associated with the web page sends a cookie to be stored on the web browser 112 of the user device 10. The cookie may store information about when the user visited the web page, including a date and/or time of the visit. The cookie can also store data about the links, buttons, or other content presented by the web page, about ads that the user has viewed, about pages that the user has viewed, and the like. When the user visits the website at a later date, the website may later retrieve data stored in the cookie for the user and determine information about the user's last visit(s) to the website (e.g., when the user last visited the website, what the user viewed, what the user accessed, and other similar activity on the website). In certain embodiments, the cookie stores information about a web browser that is specific to a particular domain, and the browsing history of the user on other web sites is not stored on the cookie.

In some embodiments, the cookie stores information about the identity of the user. This information can be a user identifier (ID), a user name, a password, login information, an Internet Protocol (IP) address, a unique session identifier, or other identifying information for determining whether a user is logged into a website. In some embodiments, the cookie is called an authentication cookie.

The ad bidder 130 generates a social network cookie 114 for a user. In some embodiments, the ad bidder 130 comprises a social networking system. So, when the user logs into the social networking system, the social network cookie 114 is generated and stored on the user's web browser 112 of the user device 110. The social network cookie 114 stores information indicating whether the user is exchanging information with the social networking system via the user device 110. Hence, data is stored on the social network cookie 114 to indicate whether the user is logged into the social networking system. Based on information in the social network cookie 114, data in the ad bidder 130 associated with the user is retrieved and used by the ad bidder 130 to select an advertisement if the user is logged into the social networking system.

When the user visits a third party web page, the ad bidder 130 receives a request to present an advertisement on the third party web page. If the user is logged-in to the social networking system, the ad bidder 130 determines the identity of the user from the social network cookie 114 and uses information from the social network cookie 114 to retrieve a user profile from the user profile database 132. The ad bidder 130 requests information from the user profile database 132, such as users connected to the user identified by the social network cookie 114, actions performed by the user identified by the social network cookie 114, or information included in user profile associated with the user identified by the social network cookie 114.

Data associated with the user identified by the user profile database 132 is communicated to the advertisement ("ad") analytics engine 138. The ad analytics engine 138 selects an ad for presentation to the user based on the information in the user profile database 132 associated with the user identified by the social network cookie 114. For example, the user profile database 132 includes data indicating the user identified by the social network cookie 114 visited a sports web page (e.g., www.espn.com) three times in the past week and has expressed a preference for the NIKE® brand page on a social networking system. Hence, the ad analytics engine 138 determines that the user has an affinity for sports and selects an ad for sports-related content. Selecting ads based on a user's profile data and associated social data from a social networking system, or similar system, is further described in U.S. application Ser. No. 12/898,662, filed on Oct. 5, 2010, entitled "Providing Social Endorsements with Online Advertising," which is incorporated by reference in its entirety.

The user device 110 also stores a device cookie 116 that describes user interactions with content via the user device 110. In one embodiment, the device cookie 116 stores data from a web browser 112 of the user device 110 describing web pages visited using the web browser 112, advertisements presented via the web browser 112, advertisements accessed via the web browser 120, or other suitable data. In one embodiment, the device cookie 116 is stored when the user of the user device 110 is not logged into a social networking system. Hence, while the information in the user profile database 132 accessible via the social network cookie 114 is associated with a particular user identified by the social network cookie 114, information in the device cookie 116 provides information about interactions with content using the user device 110 rather than interactions with content by a particular user. Thus, the device cookie 116 may include data from one or more users using a user device 110. Data stored by the device cookie 116 may include the web addresses that were visited, the dates and times of those visits, the content accessed from the visited web pages via the user device 110, the impressions of ads presented to the device 110, or any other suitable data.

When the ad bidder 130 receives a request from a user device 110 for an advertisement to present along with a web page from the third party server 120, the ad bidder 130 accesses the user device to determine if the social network cookie 114 is stored on the user device 110 (e.g., the ad bidder 130 determines if the user is logged-in to a social networking system). In one embodiment, if the social network cookie 114 is not stored by the user device (i.e., the user is logged-out of the social networking system), the ad bidder 130 determines if the device cookie 116 is stored by the user device 110. If the device cookie 116 is stored and the social network cookie 114 is not stored, the ad bidder 130 retrieves from the device cookie 116 and communicates the retrieved data to the ad analytics engine 138, which selects one or more ads to display in conjunction with the web page from the third party server 120 based on data included in the device cookie 116. For example, the device cookie 116 includes data indicating that various clothing web pages were visited via the user device 110 in the past week along with information indicating that ads for women's designer shoes were accessed. Based on this information, the ad analytics engine 138 selects an advertisement for presentation, such as an advertisement for designer shoes or clothes. In some embodiments, the ad analytics engine 138 selects an advertisement for presentation from descriptions of advertisements stored in an ad database 136 of the ad bidder 130.

In some embodiments, a social plug-in renders on a web page from the third party server 120 when the device 110 requests the web page. A social plug-in may be a button, link, window, bar, or comment box (e.g., a like button, a share button, a subscribe button, comments box, activity feed, recommendations box, recommendations bar, login button, or like box, etc.), or other suitable interface on a third party web page that is displayed to a user viewing the third party web page. The social plug-in is associated with the social networking system, or with the ad bidder 130, and when the web page from the third party server 120 is rendered by the browser 112, instructions generating the social plug-in are executed, allowing data to be retrieved from and/or communicated to the social networking system or the ad bidder 130. In one embodiment, the social plug-in captures data describing a social networking system user's interactions with content via the user device and communicates the captured data to the social networking system or to the ad bidder 130 for storage in the user profile database 132.

In one embodiment, the social networking system or the ad bidder 130 stores data from the device cookie 116 in the device database 134, allowing a record of interactions with content by the user device 110 to be stored. For example, a profile for the user device 110 including data from the device cookie 116 is stored in the device database 134. The profile for the user device 110 may include one or more of: a viewing history of web pages (including dates, times), impressions of ads, accesses of ads or content, and data indicating whether accessed web pages rendered social plug-ins. The profile for the user device 110 may be stored over time to generate a history of viewed web pages, ad impressions, and other interactions with content that may be used to select relevant ads for presentation via the user device 110.

Figure 2:
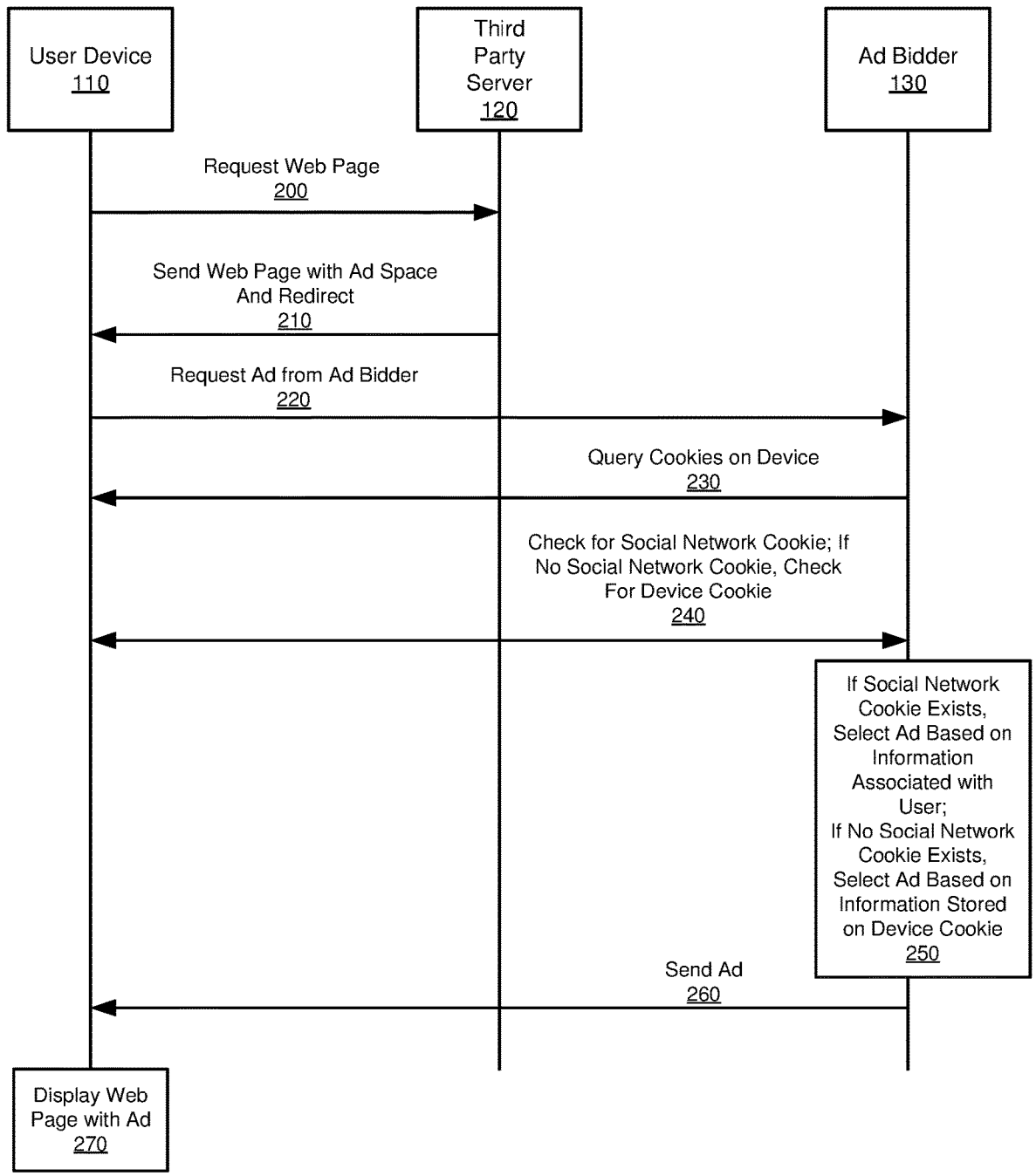
FIG. 2 is an interaction diagram illustrating a method for presenting an advertisement to a user device, in accordance with an embodiment of the invention.

FIG. 2 shows an interaction diagram of a method for selecting an advertisement for presentation with a third party web page. The example shown by FIG. 2 illustrates communication between a user device 110, a third party server 120, and an ad bidder 130, which is a social networking system in the example of FIG. 2. The user device 110 sends 200 a request for a web page to the third party server 120, which sends 210 the requested web page to the user device 110. The web page includes space for one or more advertisements as well as instructions to query the ad bidder 130 for an advertisement to present in the space.

The user device 110 requests 220 an ad from the ad bidder 130, causing the ad bidder 130 to check 240 the user device 110 for a stored social network cookie 114. As described above in conjunction with FIG. 2, the social network cookie 114 stores information indicating whether the user is exchanging information with the social networking system via the user device 110. In one embodiment, the social network cookie 114 is stored by the user device 110 when a user is logged into the social networking system via the user device 110 but is not stored by the user device 110 when a user is not logged into the social networking system using the user device 110. If the ad bidder 130 determines the social network cookie 114 is stored by the user device 110, the ad bidder 130 retrieves information associated with the user identified by the social network cookie 114 from the user profile database 132 and uses the retrieved information to select 250 an advertisement for presentation to the user.

If the ad bidder 130 determines the social network cookie 114 is not stored by the user device 110, then the ad bidder 130 checks 240 if the user device 110 stores a device cookie 116. If the device cookie 116 is stored by the user device 110 and the social network cookie 114 is not stored by the user device 110, the ad bidder 130 retrieves data from the device cookie 116 describing interactions with content through the user device 110 and selects 250 an advertisement based on the interactions stored by the device cookie 116. The selected ad is sent 260 from the ad bidder 130 to the user device 110, which displays 270 the selected ad along with the web page.

In some embodiments, the ad bidder 130 includes social data from the social network along with the selected ad if the user of the user device 110 is logged into the social networking system (i.e., if the social network cookie 114 is stored on the user device 110). For example, the ad bidder 130 determines a number of users of the social networking system that have liked a particular product or a brand page in the social networking system associated with the selected ad. The social data is combined with the selected ad and the combined data is transmitted to the user device 110. For example, when a user device 110 requests an ad for a web page, the ad bidder 130 retrieves data from the user profile database 132 for a user identified by the social network cookie 114 and selects an ad for a golf brand, TAYLORMADE®, for display with the web page based on stored interactions between the identified user and objects in the social networking system associated with golf and/or with TAYLORMADE®. A brand page in the social networking system may be associated with TAYLORMADE®, and a number of users may have expressed a preference for the brand page. Hence, the ad bidder 130 may transmit the ad for TAYLORMADE® and the number of social networking system users liking the brand page to the user device 110.

The ad and the number of users liking the brand page are displayed by the user device 110 along with the web page.

In another embodiment, the third party server 120 is authorized to access data maintained by the ad bidder 130 (the third party server is "connected to" the ad bidder 130). The third party server 120 may receive log-in or other identifying information from the user device 110 (a username and password, "userID") identifying an account associated with the user by the ad bidder 130 and the third party server 120 communicates the identifying information to the ad bidder 130 to retrieve information from the user profile database 132 associated with the account. The log-in or other identifying information is provided by the user to the third party server 120, which communicates the identifying information to the ad bidder 130, allowing user profile information or other information to be used in selecting an advertisement for presentation with a web page from the third party server 120. The third party server 120 may communicate information identifying the user to the ad bidder 130 using an application programming interface (API) provided by the ad bidder 130. Hence, the third party server 120 sends the log-in information ("userID") to the ad bidder 130, which determines the user profile and data associated with the userID and selects an ad based on the determined user profile and data. Details about accessing user data by the third party server 120 are provided in U.S. patent application Ser. No. 12/324,761, filed on Nov. 26, 2008, which is incorporated by reference in its entirety.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving, at an online system via a user device, a request from a user for one or more advertisements to present along with a web page, the web page including an instance of a plug-in that is executed in connection with the web page being rendered by a browser of the user device;
   determining, by the online system, that the user device is not storing a cookie of the online system based on information received from the user device; and
   responsive to determining that the user device is not storing the cookie of the online system:
      receiving via the execution of the instance of the plug-in included in the web page, a browsing history from a device cookie stored on the user device, the browsing history identifying web pages accessed via the user device, the browsing history being stored in the device cookie by other instances of the plug-in included in the web pages, the other instances of the plug-in being executed in connection with the web pages being rendered by the browser of the user device;
      selecting an advertisement based at least in part on the browsing history, and
      sending the advertisement to the user device, the advertisement presented to the user by the user device in conjunction with the webpage from the server.

2. The method of claim 1, wherein the browsing history includes one or more of:
   dates and times associated with accesses of the web pages;
   content of the web pages accessed via the user device; or
   other information associated with advertisements presented by the user device.

3. The method of claim 1, wherein the cookie when stored by the user device indicates that the user is communicating with the online system.

4. The method of claim 1, wherein the cookie when stored by the user device indicates that the user logged into the online system.

5. The method of claim 1, further comprising:
receiving, by the online system from the user device, other information indicating that the user device is storing the cookie of the online system; and
responsive to receiving the other information indicating that the user device is storing the cookie of the online system:
retrieving data associated with the user from a database of the online system;
selecting another advertisement for the user based on the data associated with the user; and
sending the other advertisement to the user device, the other advertisement presented to the user by the user device.

6. The method of claim 5, further comprising, responsive to receiving the other information indicating that the user device is storing the cookie of the online system:
generating social data based on interactions by users with an object associated with the other advertisement, and
sending the social data with the other advertisement to the user device.

7. The method of claim 5, wherein the data indicates one or more from the following: additional users connected to the user by the online system, actions performed by the user through the online system, or attributes of the user.

8. The method of claim 1, wherein the request includes an identifier of a server providing the web page to the user device.

9. The method of claim 8, further comprising:
receiving, from the server, other information provided by the user to the server, the other information identifying the user;
retrieving data associated with the user from a user database of the online system based on the other information; and
selecting the advertisement based on the data.

10. The method of claim 9, wherein the other information comprises a user name and password associated with an account of the user with the online system.

11. An online system, comprising:
one or more processors configured to:
receive, via a user device, a request from a user for one or more advertisements to present along with a web page, the web page including an instance of a plug-in that is executed in connection with the web page being rendered by a browser of the user device;
determine that the user device is not storing a cookie of the online system based on information received from the user device; and
responsive to determining that the user device is not storing the cookie of the online system:
receive, via the execution of the instance of the plug-in included in the webpage, a browsing history from a device cookie stored on the user device, the browsing history identifying web pages accessed via the user device, the browsing history being stored in the device cookie by other instances of the plug-in included in the web pages, the other instances of the plug-in being executed in connection with the web pages being rendered by the browser of the user device;
select an advertisement based at least in part on the browsing history, and
send the advertisement to the user device, the advertisement presented to the user by the user device in conjunction with the webpage from the server.

12. The system of claim 11, wherein the browsing history includes one or more of:
dates and times associated with accesses of the web pages;
content of the web pages accessed via the user device; or
other information associated with advertisements presented by the user device.

13. The system of claim 11, wherein the cookie when stored by the user device indicates that the user is communicating with the online system.

14. The system of claim 11, wherein the cookie when stored by the user device indicates that the user logged into the online system.

15. The system of claim 11, wherein the one or more processors are further configured to:
receive, from the user device, other information indicating that the user device is storing the cookie of the online system; and
responsive to receiving the other information indicating that the user device is storing the cookie of the online system:
retrieve data associated with the user from a database of the online system;
select another advertisement for the user based on the data associated with the user; and
send the other advertisement to the user device, the other advertisement presented to the user by the user device.

16. The system of claim 15, wherein the one or more processors are further configured to, responsive to receiving the other information indicating that the user device is storing the cookie of the online system:
generate social data based on interactions by users with an object associated with the other advertisement, and
send the social data with the other advertisement to the user device.

17. The system of claim 15, wherein the data indicates one or more from the following: additional users connected to the user by the online system, actions performed by the user through the online system, or attributes of the user.

18. The system of claim 11, wherein the request includes an identifier of a server providing the web page to the user device.

19. The system of claim 18, wherein the one or more processors are further configured to:
receive, from the server, other information provided by the user to the server, the other information identifying the user;
retrieve data associated with the user from a user database of the online system based on the other information; and
select the advertisement based on the data.

20. A computer program product comprising a non-transitory computer-readable storage medium containing computer program code which when executed by one or more processors cause the one or more processors to perform steps comprising:
receiving, via a user device, a request from a user for one or more advertisements to present along with a web page, the web page including an instance of a plug-in that is executed in connection with the web page being rendered by a browser of the user device;
determining that the user device is not storing a cookie of an online system based on information received from the user device; and
responsive to determining that the user device is not storing the cookie of the online system:

receive, via the execution of the instance of the plug-in included in the webpage, a browsing history from a device cookie stored on the user device, the browsing history identifying web pages accessed via the user device, the browsing history being stored in the device cookie by other instances of the plug-in included in the web pages, the other instances of the plug-in being executed in connection with the web pages being rendered by the browser of the user device;

selecting an advertisement based at least in part on the browsing history, and sending the advertisement to the user device, the advertisement presented to the user by the user device in conjunction with the webpage from the server.

* * * * *